(12) United States Patent
Puchek et al.

(10) Patent No.: US 6,794,986 B2
(45) Date of Patent: *Sep. 21, 2004

(54) ACCESS CONTROL METHOD AND APPARATUS FOR MEMBERS AND GUESTS

(75) Inventors: Daniel R. Puchek, San Antonio, TX (US); Tianning Xu, San Antonio, TX (US); David M. Tumey, San Antonio, TX (US)

(73) Assignee: Biokey, Ltd., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/260,399

(22) Filed: Oct. 1, 2002

(65) Prior Publication Data

US 2003/0034876 A1 Feb. 20, 2003

Related U.S. Application Data

(60) Division of application No. 09/759,296, filed on Jan. 16, 2001, which is a continuation-in-part of application No. 09/574,001, filed on May 19, 2000.

(51) Int. Cl.$^7$ .............................................. H04Q 9/00
(52) U.S. Cl. ...................................................... 340/5.53
(58) Field of Search ............................. 340/5.53, 541, 340/5.33; 348/143, 156, 152; 705/5, 32, 418; 187/387

(56) References Cited

U.S. PATENT DOCUMENTS

| | | | |
|---|---|---|---|
| 3,564,132 A | * | 2/1971 | Baker et al. ............... 340/5.53 |
| 3,967,702 A | | 7/1976 | Iwaska et al. |
| 3,988,570 A | * | 10/1976 | Murphy et al. ............ 340/5.33 |
| 4,006,459 A | | 2/1977 | Baker et al. |
| 4,245,213 A | | 1/1981 | Kriger |
| 4,449,189 A | | 5/1984 | Feix et al. |
| 4,471,343 A | | 9/1984 | Lemelson |
| 4,712,103 A | | 12/1987 | Gotanda |
| 4,924,416 A | | 5/1990 | Sasao |
| 4,993,068 A | | 2/1991 | Piosenka et al. |
| 5,053,608 A | | 10/1991 | Senanayake |
| 5,181,018 A | * | 1/1993 | Cowie et al. ................ 340/5.7 |
| 5,229,764 A | | 7/1993 | Matchett et al. |
| 5,259,025 A | | 11/1993 | Monroe et al. |
| 5,280,266 A | | 1/1994 | Kao |
| 5,283,644 A | | 2/1994 | Maeno |
| 5,305,390 A | | 4/1994 | Frey et al. |
| 5,386,103 A | | 1/1995 | Deban et al. |
| 5,387,768 A | | 2/1995 | Izard et al. |
| 5,408,536 A | | 4/1995 | Lemelson |
| 5,412,738 A | | 5/1995 | Brunelli et al. |
| 5,469,506 A | | 11/1995 | Berson et al. |
| 5,608,387 A | | 3/1997 | Davies |
| 5,642,431 A | | 6/1997 | Poggio et al. |
| 5,666,106 A | | 9/1997 | Nasman |

(List continued on next page.)

OTHER PUBLICATIONS

"Physical Security And Staff Tracking Solutions", 3 pages, Aug. 20, 1999.
"Touchlock II™", 5 pages, Aug. 20, 1999.
"The LBV®", 5 pages, Aug. 16, 1999.

Primary Examiner—Brian Zimmerman
(74) Attorney, Agent, or Firm—Nixon Peabody, LLP; Marc S. Kaufman

(57) ABSTRACT

An automated access control apparatus and method. Identification data is compared with stored data to determine if a person should be granted access to an area. If granted access, the person is prompted to indicate a number of guests desiring access. As the person and the guests pass through entrance, the persons are counted and proper personnel is notified if an unauthorized number of persons enters the area. Unauthorized entries are recorded as image data that can be played in real time or at a later time for review. Guest entry is logged for billing purposes.

1 Claim, 3 Drawing Sheets

U.S. PATENT DOCUMENTS

| | | |
|---|---|---|
| 5,715,325 A | 2/1998 | Bang et al. |
| 5,719,950 A | 2/1998 | Osten et al. |
| 5,761,329 A | 6/1998 | Chen et al. |
| 5,802,199 A | 9/1998 | Pare, Jr. et al. |
| 5,805,719 A | 9/1998 | Pare, Jr. et al. |
| 5,815,252 A | 9/1998 | Price-Francis |
| 5,850,470 A | 12/1998 | Kung et al. |
| 5,862,297 A | 1/1999 | Timmermans |
| 5,892,838 A | 4/1999 | Brady |
| 5,901,238 A | 5/1999 | Matsushita |
| 5,903,225 A | 5/1999 | Schmitt et al. |
| 6,160,903 A | 12/2000 | Hamid et al. |
| 6,339,375 B1 | 1/2002 | Hirata et al. |

* cited by examiner

ACCESS CONTROL METHOD AND APPARATUS FOR MEMBERS AND GUESTS

RELATED APPLICATION DATA

This application is a continuation-in-part of applicant's filed patent applications Ser. No. 09/574,001 filed May 19, 2000 entitled DISTRIBUTED BIOMETRIC ACCESS CONTROL APPARATUS AND METHOD and ACCESS CONTROL METHOD AND APPARATUS which is being filed concurrently herein, and the disclosures of which are incorporated herein by reference.

BACKGROUND OF THE INVENTION

1. Field of the Invention

The invention relates to automated systems for permitting authorized persons to access secured buildings or other areas while preventing such access by unauthorized persons. More particularly, the invention relates to an access control system which identifies authorized persons and permits access by the authorized person and their approved guests while permitting monitoring and recording of access.

2. Description of the Related Art

The invention relates to controlling access into a restricted area and thus the term "access", as used herein, refers to physical entry into a building, or other restricted area, such as a room, a locker, a cabinet, or the like. However, the restricted area can be the exterior of a building or the like and thus the invention can be applied to controlling entry into or exit out of a building or other area. There have always been situations in which it was desirable to restrict access to certain physical areas to a select person or group of people. Such restricted access has been accomplished by fences, walls, locks and other barriers. However, even the use of barriers has not prevented unauthorized access. Accordingly, it has been necessary in many instances to provide human surveillance in the form of a security guard or receptionist at an entrance to an area or through the use of video cameras or the like to transmit images to persons at a remote or centralized location. Of course, the use of personnel and video cameras can become expensive and is only as reliable as the personnel and their state of alertness at any particular time.

The complexities of modern society have only served to increase the need for access control. For example, many government agencies and contractors work on matters that are of a confidential or even "top secret" nature. In fact, most workplaces, such as offices, warehouses, and even retail stores in some instances, have a need to implement access control to prevent the theft of intellectual property and/or goods. Further, "members only" establishments, such as health clubs, country clubs, and the like, may derive revenue from membership fees and thus must restrict access to current members and approved guests. Of course, the use of personnel to monitor access adds significant financial overhead. However, particularly in members only establishments, the costs of monitoring personnel must be balanced with the loss of revenue due to access by non members or non approved guests. Therefore, many members only establishments have an employee stationed at the entrance during all hours of operation. The salary, benefits, and other costs associated with such an extra employees are significant.

Many members only establishments issue identification cards to their members, employees and other authorized personnel. Often, the identification card includes a picture of the authorized person. However, such an identification card s till requires a security guard or other personnel for verification. Also, such cards are easily forged by replacing the picture with that of an unauthorized person. To overcome these limitations, it is known to provide the authorized person with a personal identification number (PIN) or other identifying code. The identifying code can be encoded in a magnetic strip or the like in a security card and read by an automated reader at an entrance to grant access only to persons having the card. Alternatively, the code can be entered by the user on a keypad to gain access. However, the use of identifying-codes also drawbacks in access control applications. In particular, the identification card can be stolen or the user can be forced under duress to reveal their code. In such cases, unauthorized possessors of the card or code can gain access to a restricted area.

The use of biometrics has been proposed as a solution to the limitations noted above. Generally, the term "biometrics" refers to the study of measurable biological characteristics, i.e. biometric parameters, of a living being. In the context of security, "biometrics" refers to techniques that rely on a unique, measurable characteristic of a living being for automatically recognizing or verifying identity. Examples of biometric parameters are facial data, retinal data, fingerprint data, speech data, and the like.

Generally, biometric systems operate in the following manner. First, a system captures a sample of at least one biometric parameter of an authorized person during an "enrollment" process. The parameters are then converted by the system into a mathematical code, i.e., data, that is stored as the biometric template representing measured biometric parameters for that person. Central to a biometric system is the "engine" which processes the biometric data in accordance with various algorithms or other processing mechanisms.

Some biometric systems use "identification" methods and some use "verification" methods. In identification systems, a sample is presented to the biometric system and the system then attempts to find out who the sample belongs to by comparing the sample with a plurality of templates obtained through enrollment. Verification systems on the other hand perform a one-to-one process where the biometric system is seeking to verify identity. A single biometric sample is matched against a single template obtained during enrollment. If the two match, the system effectively confirms that the person actually is who he presents himself to be. The key difference between these two approaches centers on the logic addressed by the biometric system and how these fit within a given application. Identification systems decide who the person is and can check whether more than one matching biometric template exists. Accordingly, identification systems can deny access to an individual who is attempting to pass himself off with more than one identity. Verification, on the other hand only decides if the person is who he says he is. Accordingly, identification systems are more versatile and powerful. However, verification systems generally require less processing horsepower and thus are commonly used.

In typical biometric access control systems, biometric sensors are placed proximate entrances and are linked to a central computer having the engine and biometric "enrollment" data, i.e., templates, representing biometric parameters of authorized users collected from a central enrollment station. If the biometric parameter collected at the entrance matches a template stored in the central computer, access is granted. However, conventional biometric systems have several limitations. In particular, the sensing accuracy of certain biometric parameters, such as facial parameters, retinal parameters, and the like can be highly dependent on the environment in which the parameters are sensed. For example, the lighting intensity, angle and color will affect sensing of biometric parameters. Accordingly, the ability to reliably match data representing parameters collected at an entrance with data of templates collected during enrollment is limited, especially when the entrance is an external entrance where the weather, season, and time of day will affect lighting significantly. Also, sensing biometric parameters, converting the parameters to data, communicating the data to a central computer, and comparing the data parameters with templates of enrollment data in the central computer is relatively time consuming, even with high speed computers and communication links. Accordingly, such systems present significant inconveniences to the authorized persons through improperly rejected access and time delays prior to granting access. Further, the use of a centralized computer for storing enrollment data also renders each entrance dependent on the central computer.

The use of less environmentally affected biometric parameters, such as fingerprint parameters can alleviate some of the problems noted above. However, sensing such parameters requires that the person desiring access make physical contact with a sensor, such as a fingerprint scanner, upon each entry request. Also, such parameters are easily affected by skin debris, and skin blemishes. Therefore, the person desiring access may have to wipe off their finger, not to mention remove any gloves, prior to submitting to the physical contact with the sensor. The match tolerance between a template and data corresponding to a measured parameter can be increased to minimize lockout of authorized users. However, such an approach inherently reduces the accuracy and effectiveness of the system by increasing the likelihood of allowing access to unauthorized users.

Further, known automated access control systems including biometric systems, do not address the specific needs of members only institutions, such as the need to prevent unauthorized persons from entering on the "coattails" of an authorized person, a technique referred to as "tailgating" herein. Also, known automated access control systems do not permit non-member, approved guests of members, to enter in an authorized manner. Also, such systems do not provide adequate records of member and guest entry and do not provide flexible control and reporting of such entry.

U.S. Pat. No. 5,305,390 discloses a system for recognizing and counting people as they move past a particular point. This patent also discloses a security system application in which the system is used to detect if an unauthorized person follows an authorized person into the secured area (see column 4, lines 47–66). This reference does not relate to biometric security devices and does not provide access for guests. Accordingly, the system disclosed in U.S. Pat. No. 5,305,390 is not suitable for typical members only institutions.

U.S. Pat. No. 5,283,644 discloses a monitoring system in which presence is detected in a protected area. Upon detecting a presence, image data is collected by a camera and collated with image data of authorized persons. If the image data does not match image data of authorized persons, the presence is reported to security through report data. This reference relates to internal surveillance and not access control.

U.S. Pat. No. 5,280,266 discloses a visitor sensing device capable of being combined with a conventional intercom. When a visitor is present at a door for a specified period of time, a live image of the visitor is displayed to the occupant and an audible alarm is sounded. This reference does not relate to biometric recognition and requires that a receptionist or security person be present to review the image and converse over the intercom. Accordingly, the device disclosed in U.S. Pat. No. 5,280,266 does not eliminate the overhead associated with access personnel.

SUMMARY OF THE INVENTION

It is an object of the invention to overcome the limitations of the known systems described above.

It is another object of the invention to, obviate or limit the need for access control personnel.

It is another object of the invention to automatically control access to a members only establishment;

It is another object of the invention to permit access to guests of members of a members only establishment when appropriate;

It is another object of the invention to record data relating to guest access.

It is another object of the invention to minimize the inconvenience an obtrusiveness of biometric identification access control.

It is another object of the invention to minimize the effect of environmental variables in biometric identification access control.

It is another object of the invention to automatically indicate any security anomaly in an access control system.

A first aspect of the invention is an access control apparatus for selectively granting access to an area comprising a controller including a processor and memory, a data collection device coupled to the controller, a access control device, a video camera, and a sensor configured to monitor an entrance to the area. The controller is operative to compare entrance data, which includes identification data, collected by the data collection device with stored data in the memory and to operate the access control device to grant access to the area when the identification data corresponds to the stored data. The controller also is operative to repeatedly record image data output by the video camera in the memory for a predetermined period of time and to present the image data for review when a signal from the sensor indicate that a number of people entering the area does not correspond to the number of people indicated by the entrance data.

A second aspect of the invention is a method of controlling access to an area comprising the steps of, comparing entrance data, which includes identification data, collected by a data collection device proximate an entrance to the area with stored data, granting access to the area when the identification data corresponds to the store data, counting persons accessing the area, repeatedly recording image data for a predetermined period of time and presenting the image data for review when a number of people counted during the counting step does not correspond to the number of people indicated by the entrance data.

BRIEF DESCRIPTION OF THE DRAWING

The invention is described through a preferred embodiment and the attached drawing in which.

DETAILED DESCRIPTION OF THE PREFERRED EMBODIMENT

Figure 1:
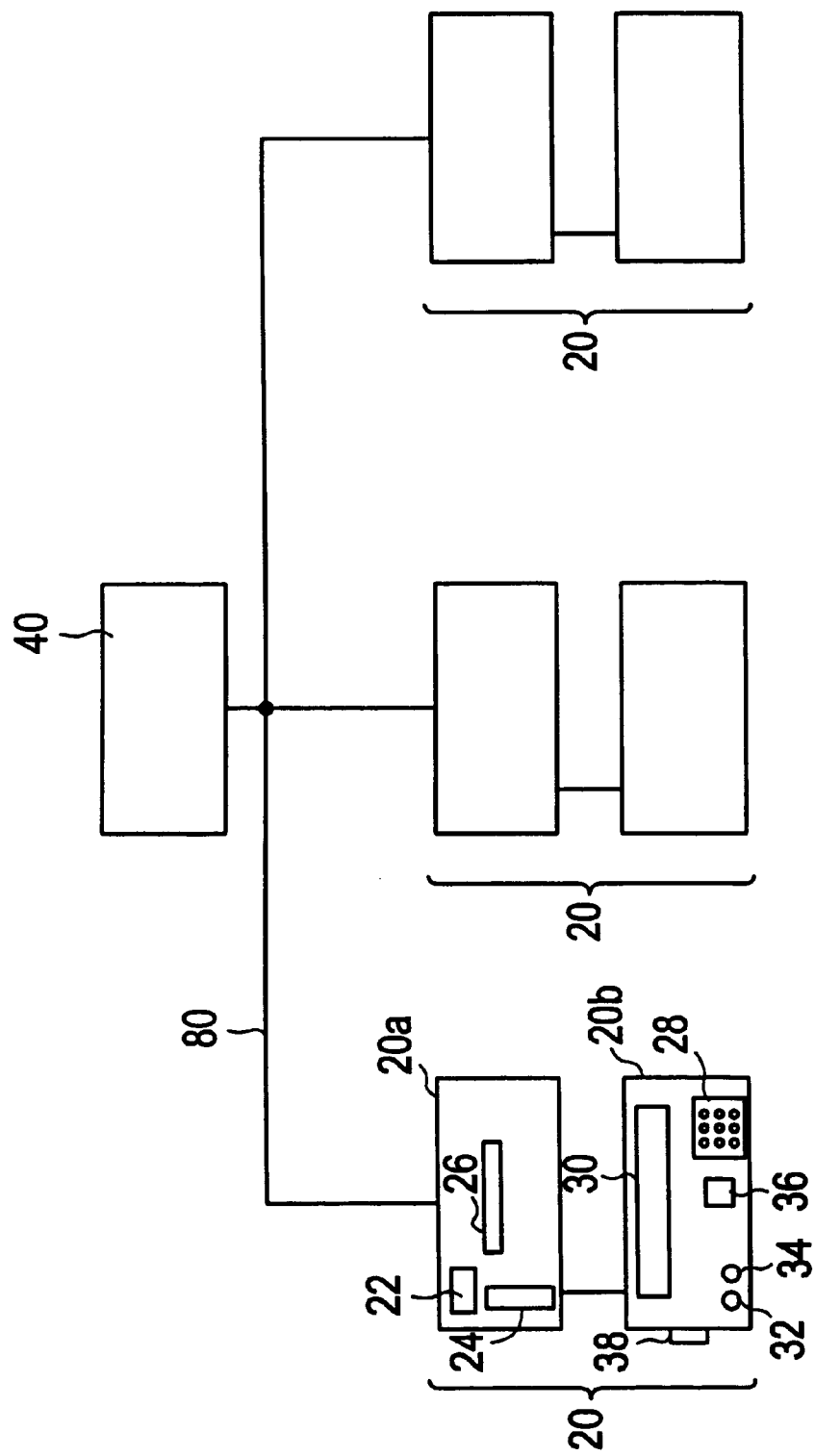
FIG. 1 is a block diagram of the architecture of an access control system incorporating the preferred embodiment.

FIG. 1 illustrates a system architecture incorporating a preferred embodiment of the invention. Access unit 20 is a digital microprocessor based computer, such as a personal computer, a minicomputer, a programmable logic controller, or any other proprietary or non-proprietary device capable of accomplishing the processing and communication functions described below. Access unit 20 includes central processing unit (CPU) 22, memory device 24 (such as a magnetic hard drive), random access memory (RAM) 26, input device 28 (such as a keypad), display 30, microphone 32, speaker 34, biometric parameter sensing device 36, access control device 38 (such as a lock solenoid, gate, or the like), a data bus (not illustrated) for providing communications between the various components, and the appropriate interfaces for each component (also not illustrated).

Biometric parameter sensing device 36 serves as an entrance data collection device and a sensor, and is a video camera for sensing facial parameters in the preferred embodiment. However, biometric parameter sensing device can be of any type, or of plural types, for sensing any appropriate parameter such as fingerprint parameter, retinal parameters, or the like. The phrase "video camera", as used herein, refers to any device capable of sensing image parameters. Access unit 20 has a control program stored in memory device 24 which includes a biometric engine and instructions for accomplishing the functions described below. The control program of access unit 20 also includes a biometric engine, such as that described in U.S. Pat. No. 5,386,103, the disclose of which is incorporated herein by reference. Access unit 20 can be divided into access panel 20a (including input device 28, display 30, microphone 32, speaker 34, biometric parameter sensing device 36, and access control device 38) and controller 20b (including CPU 22, memory device 24, and RAM 26). Access panel 20a and controller 20b can be housed together or separately. For example, access panel 20a and controller 20b can be located in close proximity to one another or controller 20b can be grouped together in a central location. The number of physical enclosures associated with access unit 20 can vary as is required by the particular application and entrance.

Access unit 20 preferably is located in close proximity to respective doors or other entrances of the building or other area to which access unit 20 is applied. Typically, access panel 20a is located just outside the doorframe and controller 20b is located inside the building or other area to prevent tampering therewith. In the case of one enclosure, access unit 20a is located to be accessible from outside the entrance. Note that plural access units 20 can be coupled to one another over communication link 80, such as a network, to share information, as illustrated in FIG. 1. For example, in a building having plural entrances, on access unit 20 can be provided at each door. Communication link 80 can be continuous, such as an Ethernet connection, or intermittent, such as dial-up connection over modems. Also supervisory computer 40 can be provided on the network for data acquisition, control, and the like.

Figure 2:
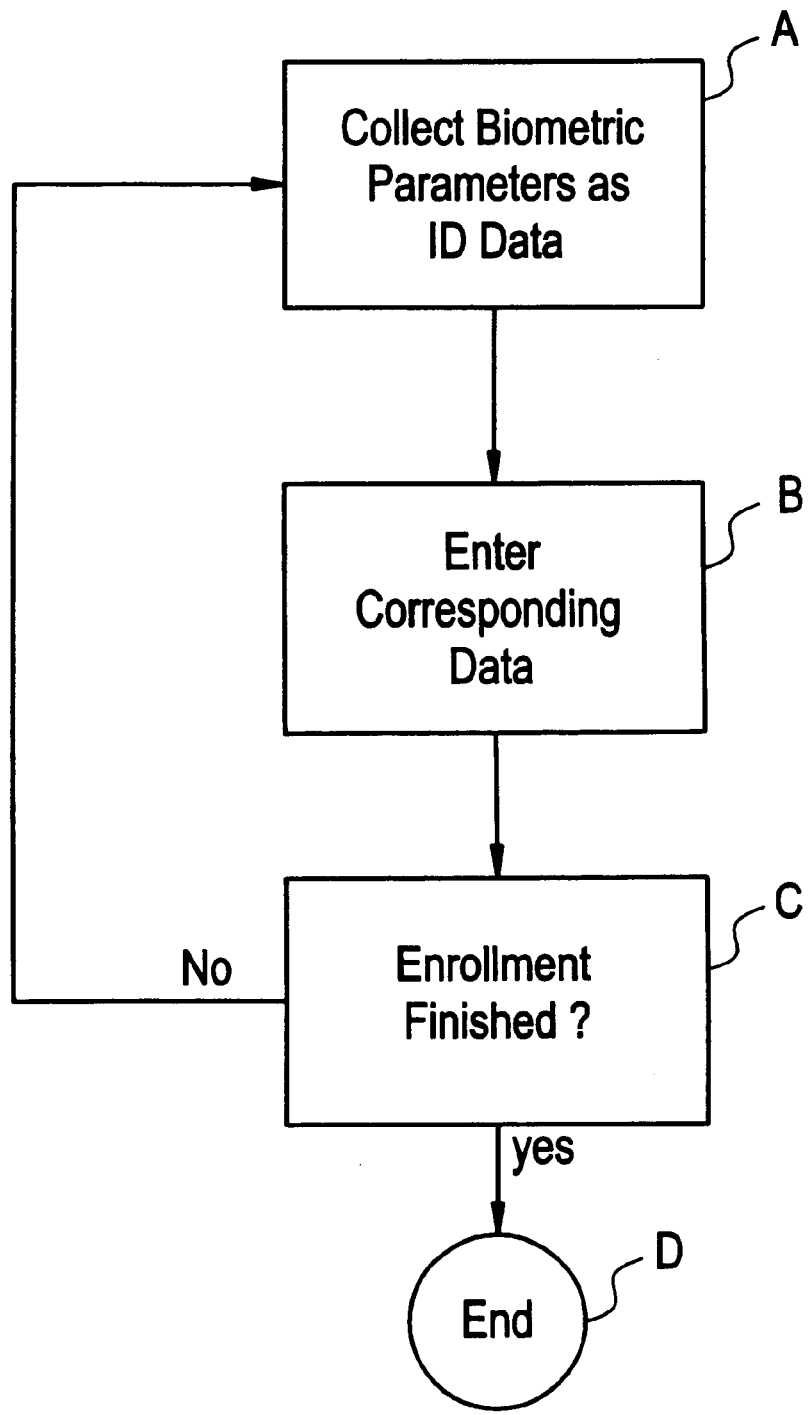
FIG. 2 is a flowchart of the enrollment procedure of the preferred embodiment.

FIG. 2 illustrates an enrollment procedure of the preferred embodiment in which persons are authorized for access. For example, members of a health club can be authorized upon joining the health club. Enrollment can be accomplished at access unit 20 or at computer 40. For example, the enrollment procedure can be similar to that disclosed in the copending application Ser. No. 09/574,001 the disclosure of which is incorporated herein. The preferred embodiment uses distributed biometric parameters (facial parameters) for permitting or denying access. Accordingly, the enrollment procedure includes collecting biometric parameters as identification data, such fingerprint, facial, wire parameter, or the like. However, the identification data could be in any other form, such as a PIN number, a coded card, a password, or the like. The enrollment procedure preferably can be conducted at access unit 20, i.e. at the entrance, to minimize environmental variables. Also, a central enrollment station can be used. A person to be authorized for access to the area, such as a member of a members only institution, is brought to an enrollment location proximate access unit 20. For example, access unit 20 can be disposed near a reception desk of a health club or other members only institution. Biometric facial parameters are collected by biometric parameter sensing device 36 in step A. In particular, facial image data is recorded or collected by biometric parameter sensing device 36 and converted to facial data by the biometric engine. This is accomplished by placing the person in view of biometric parameter sensing device 36 and selecting appropriate choices on input device 28, as prompted on display 26, in accordance with the control program stored in memory device 24 and being executed by CPU 22. Data corresponding to the sensed facial parameters is then recorded in memory device 24. Using input device 38, corresponding data, such as the member's name, membership number, access privileges (e.g. time of day, day, number of permitted guests) and the like is entered in step B and stored in memory device 24 in correspondence to the data stored in step A.

In step C, it is determined if all enrollment is finished, i.e. if the operator does not wish to enroll other persons at this time. If so, the procedure ends at step D, if not, the procedure returns to step A for collection of biometric parameter data for another person. Enrollment data, including biometric data and corresponding data entered in steps A and B respectively, can optionally be downloaded to any other access units 20 or computer 40 over communication link 80. The enrollment data can be stored in memory device 24 of access unit 20 as templates in any format, such as known database formats. Of course, the enrollment procedure can be accomplished at any time and one or more persons can be enrolled during each procedure. Also, enrollment data-can be deleted or modified as needed. For example, when a membership is revoked or canceled, it may be desirable to delete the person's template so that they will not be granted access to the facilities in the future. Also, a person's access privileges may be increased or decreased based on a type or level of membership. For example, certain members may be given a discount but only permitted to use facilities on certain days or at certain times of the day. Further, the template of a person whose membership has been revoked may be left while their access privileges are revoked. In such a situation presence of the person near an entrance can be flagged as an anomaly as described below.

Figure 3:
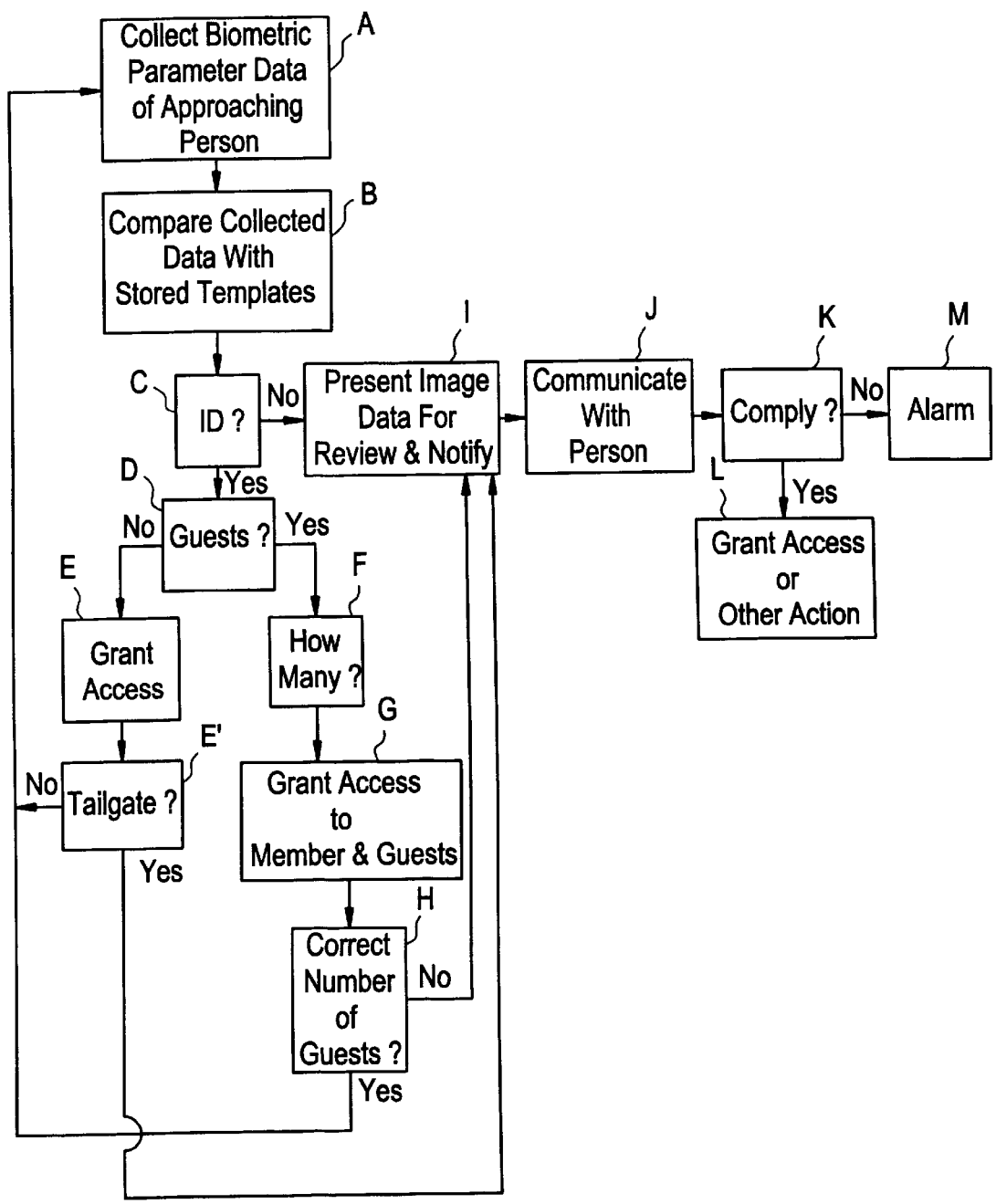
FIG. 3 is a flowchart of the access control and reporting procedure of the preferred embodiment.

When enrollment for one or more authorized persons is finished, access unit 20 is ready to identify authorized persons and control access to a building or other area. FIG. 3 illustrates the procedure for controlling access. As a person approaches an entrance having access unit 20, biometric parameter sensing device 36 begins to collect facial image data or another biometric parameter in an attempt to identify the person as an authorized person. At this time, a secondary enrollment procedure can be accomplished using another biometric parameter. Biometric parameter sensing device 36 can be in constant operation and can begin to sense facial parameters when a person is within a prescribed range.

Alternatively, biometric parameter sensing device 36 can be turned on by the presence of the person using a proximity sensor or the like. The engine disclosed in U.S. Pat. No. 5,386,103 is capable of sensing facial parameters while the subject person is several feet away. In any event, as the person approaches access unit 20, facial parameters are sensed and facial data is collected in step A. In step B, the facial data corresponding to the sensed parameters are compared with templates stored in memory device 24 of access unit 20.

In step C, access unit 20 determines if the approaching person has been identified as a person that is authorized for access (e.g. a member) through steps A and B and, if so, prompts the person to indicate whether or not they wish to have guests admitted with them in step D. Note that, in order to be authorized for access, the person must be recognized by matching their parameters with a template and must have access privileges, as indicated by the corresponding data, that are effective at the time of entrance. The prompting can be through a recorded or synthesized voice played over speaker 34, through an audible prompt or through a message on display 30. The person then indicates if they have guests by pressing appropriate buttons on input device 28. Alternatively, indication can be through microphone 32 using voice recognition software. If no guests are requested to be admitted, access unit 20 operates access control device 38 to grant access to the person in step E. Step E can require that the person press a button and/or turn a door handle to open the door. Also, an indication of granted access, such as a green light, an audible indication, or a message on display 30 can be enunciated.

If the person indicates that guests are to be admitted in step D, the person is prompted to indicate how many guests are to be admitted through input device 28, voice commands, or in any other manner in step F. After entry of the number of guests, access is granted to the person and the indicated number of guests in step G. In particular, the facial recognition engine can distinguish faces and thus can act as a sensor to count people passing thereby. Alternatively, a separate proximity sensor, light beam, or the like can be used to count people passing through the entrance in step. If the number counted does not correspond to the number of guests requested, image data of the guests entry recorded by biometric parameter sensing device 36 or a separate video camera is presented for review by security or other personnel in step 1. Counting of guests can be initiated and when the door is opened (by use of a door sensor or the like) and can be terminated when the door is closed.

In particular, the passage through the entrance of the incorrect number of guests is flagged as an anomaly and access unit 20 notifies appropriate personnel by one or more of sounding an alarm, sending a message (by email, fax, telephone for example), or the like in step 1. As noted above, biometric parameter sensing device 36 collects image data of each approaching person or persons. Ordinarily, the image data can be discarded, i.e erased from memory shortly after being recorded if a proper authorized entry is completed. However, in the event of an anomaly such as an incorrect number of guests in this case, the previous, several seconds of image data is presented, i.e. saved and sent to computer 40, or a monitor located at a desired location for display in substantially real time or for later review. Accordingly, images, i.e. video, of each anomaly creating approach can be viewed in step 1 or at a later time to determine the appropriate action. In step J, security personnel or the appropriate person viewing the entry images can communicate with the person or persons causing the anomaly through the microphone 32 and speaker 34 to ascertain the person's status or to warn the person of their violation of membership policy.

For example, the member may have inadvertently entered the wrong number of guests. In such a case, the member can be given the opportunity to comply by reentering the number of guests or taking other action in step K. If compliance is obtained, the appropriate access is granted in step L, which can include granting access to the member and to the proper number of guests o r taking care of clerical matters to change membership status and access privileges. Note that, in step F, if the number of guests entered is higher than the number of guests that the member is permitted to bring in at one time, or renders a total of guests for that member over a particular time period higher than a preselected limit, the procedure can proceed to step I and J in which the person can communicate with security personnel to correct the matter. Entry of each member and guest can be logged, time stamped, and recorded in correspondence to the member's identification data to keep track of guests admitted for that member for purposes of limiting the number of guests or for billing purposes. If an anomaly is not detected, the image data recorded over the previous time period can be erased. Accordingly, a "loop" of video image data is recorded over and over and only need be presented when an anomaly is detected. Therefore, there is no need to have personnel constantly view surveillance video or to save and store large amounts of the video data. The personnel is notified when there has been an anomaly and shown only the relevant video images. The viewing monitor can be coupled to access unit 20 over communications link 80 or in any other appropriate manner.

Various actions can be flagged as anomalies and subject to review in steps I, J, K, L, and M of the procedure illustrated in FIG. 3. For example, unauthorized persons gaining access on the coattails of authorized persons could be flagged. Each time access is granted in step E of FIG. 3, access unit 20 can count the number of persons passing through the entrance in the manner described above in step N and the procedure goes to steps I–M. If more than one person enters a "tailgating" anomaly is detected. Counting can be accomplished with biometric parameter collection device 36 or with any appropriate sensor, such as a photo sensor, proximity sensor, or the like. Further, an anomaly can be any situation other than the normal granting of access to an authorized person within their access parameters. An anomaly can result from the satisfaction of any predetermined criterion. For example, it may be desirable to know if a particular authorized person or persons, gains access more than a preset number of times. Also, it may be desirable to know if a previously authorized person whose access privileges have been revoked is near an entrance. Access unit 20 is programmed in a desired manner to detect anomalies under any particular set of conditions. Note that if compliance is not reached in step K, an alarm can be sounded, or other appropriate action can be taken, in step M.

It can be seen that the preferred embodiment provides the convenience of reliable automated access control without sacrificing the flexibility required by many members only institutions and other entities. Also, the preferred embodiment processes the biometric parameters at the entrance and thus biometric identification can be accomplished very quickly. Further, when at least one of the enrollment procedures is conducted at the entrance, environmental variables are minimized.

There can be any number of access units. Any hardware and/or software can be used in the invention for accomplishing the functions disclosed above. The various data communication and storage can be accomplished using any appropriate formats, protocols, and media. The various disclosed features of the invention can be combined in any manner. The control program can be programmed in any programming language by one of skill in the art based on the functions disclosed herein. Any biometric or other technologies can be used for identification in the invention and any type of sensors or scanners can be used to collect the appropriate data or parameters. Identification can be accomplished through collecting of data or parameters other then biometric data or parameters. The invention can be applied to identification and/or verification systems. The access control device can be any device for selectively providing access. The invention can be used to control entry into an area or exit from the area. Accordingly, the term "entrance", as used herein, refers to a door, gate, passage, or the like through which persons can enter or leave an area.

The invention has been described through a preferred embodiment. However various modifications can be made without departing from the scope of the invention as defined by the appended claims.

What is claimed:

1. A module operative to be used on connection with an access control apparatus of the type including a processor, a data collection device, and an access control device, said module comprising:

means for comparing entrance data collected by the data collection device with stored data;

means for operating the access control device in accordance with the result of said means for comparing to grant access in a controlled manner;

means for determining a number of people gaining access; and means for taking predetermined action when the number of people gaining access does not correspond to the entrance data wherein said predetermined action comprises recording image data of people gaining access and playing the image data back for review.

* * * * *